(No Model.)
G. LE CLAIR.
AUTOMATIC SAFETY CLUTCH.
No. 405,845. Patented June 25, 1889.
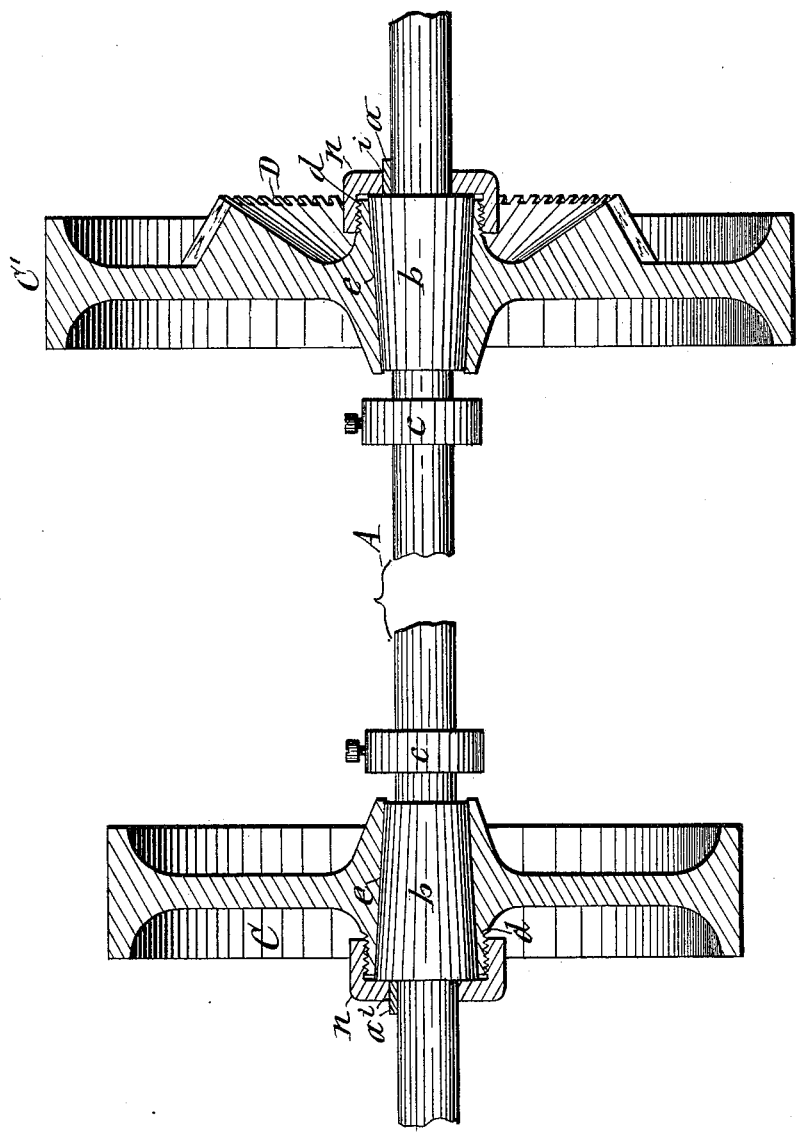
WITNESSES:
INVENTOR
George Le Clair
BY
Duell, Laass & Duell
ATTORNEYS

UNITED STATES PATENT OFFICE.

GEORGE LE CLAIR, OF OSWEGO, NEW YORK, ASSIGNOR TO THE LE CLAIR MANUFACTURING COMPANY, OF SAME PLACE.

AUTOMATIC SAFETY-CLUTCH.

SPECIFICATION forming part of Letters Patent No. 405,845, dated June 25, 1889.

Application filed March 21, 1889. Serial No. 304,107. (No model.)

*To all whom it may concern:*

Be it known that I, GEORGE LE CLAIR, of Oswego, in the county of Oswego, in the State of New York, have invented new and useful Improvements in Automatic Safety-Clutches, of which the following, taken in connection with the accompanying drawing, is a full, clear, and exact description.

The purpose of this invention is to guard against breakage of machines incident to sudden clogging thereof, and is more specially designed for use on tobacco-cutting machines and other machines equipped with knives which are liable to encounter hard foreign substances in the material to be cut, and for said purpose I employ a safety-clutch of peculiar construction, as hereinafter more fully described, and specifically set forth in the claims.

The annexed drawing represents a side view and partly a sectional view of a shaft with pulleys and wheels mounted thereon and provided with my safety-clutch.

A represents the driving-shaft or other rotary shaft of the machine to be protected from accidental injury or breakage during its operation as aforesaid.

$b$ designates the frictional bearing, preferably of the form of a conical hub, rigidly secured to the shaft.

C represents either a balance-wheel or a pulley or other power-transmitting wheel, the hub of which is provided with a conical eye $e$ corresponding to the conical bearing $b$ and adapted to slide longitudinally thereon. The portion $d$ of the hub which rides on the large end of the bearing $b$ is screw-threaded externally, and the threads thereof run from the wheel in an opposite direction from that of the rotation of said wheel. At the large end of the bearing $b$ is a spline $a$, secured to the shaft, and on said portion of the shaft slides a nut $n$, provided with a slot $i$, through which the spline passes, and thus confines the nut circumferentially on the shaft. By sliding the wheel C onto the conical bearing and turning said wheel so as to cause the screw-threaded portion $d$ of the hub to engage the nut the wheel can be drawn onto the bearing $b$ with any desired force, and thus the wheel can be bound to said bearing to a sufficient degree to allow the requisite power to be transmitted from one to the other, and yet allow the wheel to slip on the bearing when said wheel is subjected to undue strain or jars, and so soon as this takes place the wheel slides toward the small end of the bearing $b$ and completely loses its hold thereon, and thus prevents transmission of motion either from the shaft to the wheel or from the wheel to the shaft, as the case may be.

In order to limit the longitudinal movement of the wheel C on the shaft A, I firmly secure to the latter, at a suitable distance from the small end of the bearing $b$, a collar $c$, with which the small end of the wheel-hub comes in contact after the same has slipped from the bearing $b$ sufficiently to become released from its frictional hold.

The described safety-clutch is especially well adapted to be used in connection with a pulley C', having a bevel-gear D on its side, as illustrated in the right-hand portion of the figure in the drawing, inasmuch as the shifting of the pulley from the large end of the bearing $b$ toward the small end thereof simultaneously disconnects the gear D from its companion gear. (Not shown in the drawing.)

What I claim is—

1. The combination, with a rotary shaft, of a conical bearing rigidly secured to said shaft, a wheel mounted movably longitudinally on said bearing and provided with screw-threads on the exterior of the hub over the large end of the conical bearing, and a binding-nut sliding longitudinally on the shaft and confined circumferentially thereon and adapted to engage and release the aforesaid screw-threaded hub, the screw-threads running from the wheel in opposite direction from the rotation of said wheel, substantially as and for the purpose shown and set forth.

2. The combination, with the shaft A, of the rigid conical bearing $b$, spline $a$ at one end of said bearing, collar $c$, near the opposite end thereof, the wheel C, provided with the conical eye $e$ and with the screw-threaded hub portion $d$, and the nut $n$, sliding on the shaft and provided with the slot $i$ and adapted to engage and release the aforesaid screw-threaded hub, substantially as described and shown, for the purpose set forth.

In testimony whereof I have hereunto signed my name this 31st day of January, 1889.

GEORGE LE CLAIR. [L. S.]

Witnesses:
BERNARD GALLAGHER,
HENRY R. CARRIER, Jr.